(12) United States Patent
Lashinske

(10) Patent No.: US 9,441,774 B2
(45) Date of Patent: Sep. 13, 2016

(54) HANGING DEVICE AND METHOD THEREFOR

(71) Applicant: Charles Mark Lashinske, Phoenis, AZ (US)

(72) Inventor: Charles Mark Lashinske, Phoenis, AZ (US)

( * ) Notice: Subject to any disclaimer, the term of this patent is extended or adjusted under 35 U.S.C. 154(b) by 0 days.

(21) Appl. No.: 14/285,386

(22) Filed: May 22, 2014

(65) Prior Publication Data

US 2015/0335179 A1 Nov. 26, 2015

(51) Int. Cl.
| | |
|---|---|
| *A47G 1/16* | (2006.01) |
| *F16L 37/26* | (2006.01) |
| *F16M 13/02* | (2006.01) |
| *F16L 23/032* | (2006.01) |
| *H01R 13/629* | (2006.01) |
| *H01R 13/639* | (2006.01) |
| *A47G 1/20* | (2006.01) |
| *F16M 11/04* | (2006.01) |

(52) U.S. Cl.
CPC ............ *F16L 37/26* (2013.01); *A47G 1/1606* (2013.01); *A47G 1/205* (2013.01); *F16L 23/032* (2013.01); *F16M 11/041* (2013.01); *F16M 13/02* (2013.01); *H01R 13/629* (2013.01); *H01R 13/6395* (2013.01); *A47G 1/1626* (2013.01); *F16L 2201/40* (2013.01); *Y10T 29/49828* (2015.01)

(58) Field of Classification Search
USPC ..................... 248/475.1, 476, 477, 489, 495
See application file for complete search history.

(56) References Cited

U.S. PATENT DOCUMENTS

| | | |
|---|---|---|
| 409,893 A | 8/1889 | Wray |
| 733,050 A | 7/1903 | Moore |
| 1,130,324 A | 3/1915 | Owen |
| 1,182,610 A | 5/1916 | Wiesman |
| 2,382,589 A | 8/1945 | Trevisan |
| 2,520,221 A | 8/1950 | Ponty |
| 2,549,534 A | 4/1951 | Shultz |
| 2,793,407 A | 5/1957 | Johnston |
| 3,589,755 A | 6/1971 | King |
| 3,589,758 A | 6/1971 | King |
| 4,019,298 A | 4/1977 | Johnson, IV |
| 4,315,615 A * | 2/1982 | Scocozza ............ A47G 1/1606 248/220.21 |
| 4,564,732 A | 1/1986 | Lancaster et al. |
| 5,060,898 A | 10/1991 | Chang |
| 5,244,300 A | 9/1993 | Perreira et al. |
| 5,425,524 A * | 6/1995 | Messina, Jr. ......... A47G 1/1606 248/475.1 |
| 5,433,416 A | 7/1995 | Johnson |
| 5,524,394 A | 6/1996 | Szabo et al. |
| 5,551,795 A | 9/1996 | Engibarov |
| 5,664,793 A | 9/1997 | Engibarov |
| 6,286,802 B1 * | 9/2001 | Munson ............... A47G 1/1606 248/475.1 |
| 6,290,304 B1 | 9/2001 | Lashinske |
| 6,357,194 B1 | 3/2002 | Jones, Jr. |
| 6,719,260 B1 * | 4/2004 | Hart ...................... A47G 1/168 248/466 |
| 8,757,568 B2 * | 6/2014 | Ko ......................... F16M 13/02 211/86.01 |

* cited by examiner

*Primary Examiner* — Alfred J Wujciak

(74) *Attorney, Agent, or Firm* — Weiss & Moy, P.C.; Veronica-Adele R. Cao

(57) ABSTRACT

A hanging device and method using a male portion, a female portion, and a leveling portion to hang display items level with the ground. The male portion has a V-shaped dovetail tenon and the female portion has a V-shaped dovetail mortise adapted to male with the dovetail tenon. The leveling portion is also adapted to mate with the V-shaped mortise of the female portion.

14 Claims, 6 Drawing Sheets

HANGING DEVICE AND METHOD THEREFOR

CROSS-REFERENCE TO RELATED APPLICATIONS

This application is related to U.S. application Ser. No. 11/324,948 filed on Jan. 4, 2006 in the name of the Applicant, which is now abandoned. This application is also related to U.S. application Ser. No. 10/184,489 filed on Jun. 27, 2002 in the name of the Applicant, which is now abandoned. This application is also related to U.S. Pat. No. 6,290,304 issued on Sep. 18, 2001 to Applicant.

FIELD OF THE INVENTION

This disclosure generally relates to tools devices, and more particularly, to a hanging device and method therefor.

BACKGROUND OF THE INVENTION

When hanging items, such as picture frames, on a wall it can be challenging to make sure that the item is hanging straight and level. Typically, a person will hammer a nail or hook into the wall and then hang the item from the nail/hook. A person typically must make several attempts repositioning the item on nail/hooks before the item is hung straight. It may also be difficult to display items, such as memorabilia, on flat surfaces without multiple adjustments and measurements. Hanging devices may be used to aid in the process; however, those levelers still require some time and skill on the part of the user to make sure that the item is positioned properly on the nail/hook. In other words, those levelers are only used after the items have been hung to double check the person's handiwork. If the leveler shows that the items are not level, then the user must reposition the items.

SUMMARY OF THE INVENTION

This summary is provided to introduce a selection of concepts in a simplified form that are further described below in the DESCRIPTION OF THE APPLICATION. This summary is not intended to identify key features of the claimed subject matter, nor is it intended to be used as an aid in determining the scope of the claimed subject matter.

In accordance with one embodiment of the present invention, a hanging device is disclosed. The hanging device comprises: a male portion comprising: a body; and a dovetail tenon integral with a front surface of the body of the male portion; a female portion comprising: a body; and a dovetail mortise recessed within a front surface of the body of the female portion and adapted to mate with the dovetail tenon; and a leveling portion comprising: a body adapted to mate with the dovetail mortise; and a bubble vial coupled to the body of the leveling portion.

In accordance with another embodiment of the present invention, a system for hanging items is disclosed. The system comprises: a male portion comprising: a body; and a V-shaped dovetail tenon integral with a front surface of the body of the male portion; a female portion comprising: a body; and a V-shaped dovetail mortise recessed within a front surface of the body of the female portion and adapted to mate with the dovetail tenon; and a leveling portion comprising: a body adapted to mate with the dovetail mortise; a bubble vial coupled to the body of the leveling portion; and a bubble vial receptacle coupled to the body of the leveling portion for housing the bubble vial in a horizontal orientation.

In accordance with another embodiment of the present invention, a method of hanging a display item is disclosed. The method of hanging a display item comprises the steps of: providing a hanging device comprising: a male portion comprising: a body; and a dovetail tenon integral with a front surface of the body of the male portion; a female portion comprising: a body; and a dovetail mortise recessed within a front surface of the body of the female portion and adapted to mate with the dovetail tenon; and a leveling portion comprising: a body adapted to mate with the dovetail mortise; and a bubble vial coupled to the body of the leveling portion; coupling the leveling portion to the female portion by slidably engaging the body of the leveling portion with the mortise of the female portion; leveling the female portion by using the bubble vial of the leveling portion; coupling a rear surface of the female portion to a fixed surface in a position determined to be level by the leveling portion; removing the leveling portion from the female portion; coupling a rear surface of the male portion to a display item; and coupling the male portion to the female portion by slidably engaging the tenon of the male portion with the mortise of the female portion.

DETAILED DESCRIPTION OF THE PREFERRED EMBODIMENTS

Figure 1:
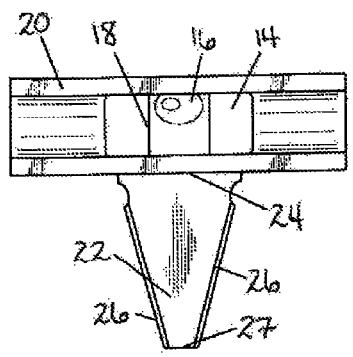
FIG. 1 is a front view of a leveling portion of a hanging device in accordance with one or more aspects of the present invention.

FIGS. 1-23 together show the hanging device 10 of the present invention. In one embodiment, as shown in the drawings, the hanging device 10 may be used to hang items from a wall or other fixed surface. However, it should be clearly understood the hanging device 10 may be used to display items on flat surfaces as well.

The accompanying FIGURES show the hanging device 10 of the present invention being used with a picture frame. However, although a picture frame is shown and described herein as an example of a display item 100 to be hung, it should be clearly understood that the hanging device 10 of the present invention may be used when hanging any type of suitable item.

Figure 2:
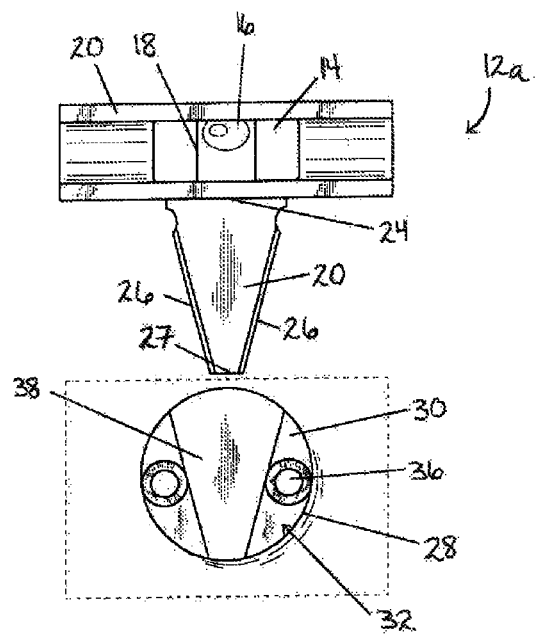
FIG. 2 is a front view of the leveling portion of FIG. 1 and a female portion of a hanging device in accordance with one or more aspects of the present invention.
Figure 3:
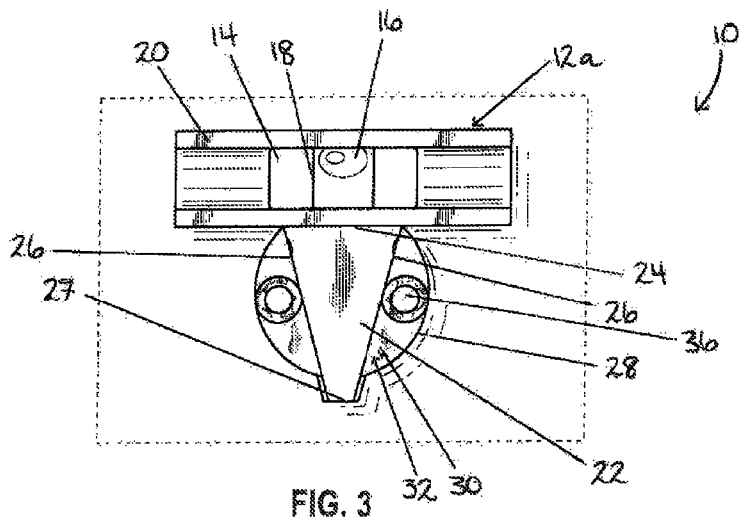
FIG. 3 is a front view of the leveling portion and the female portion of FIG. 2 shown coupled together.
Figure 4:
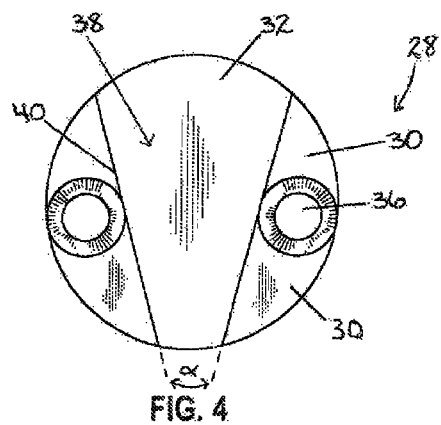
FIG. 4 is a front view of the female portion of FIG. 2.

In its simplest form, the hanging device 10 may comprise a female portion 28, a male portion 44, and a leveling portion 12. Referring to FIGS. 1-3, the leveling portion 12a (referred to generically as leveling portion 12) may have a body 22, a bubble vial 14, and a bubble vial receptacle 20. The body 22 of the leveling portion 12a may be shaped like a dovetail tenon 54 of the male portion 44 (discussed below) and adapted to slidably engage and mate with a dovetail mortise 38 of the female portion 28 (discussed below). Thy body 22 of the leveling portion 12a may have the same dimensions of the dovetail tenon 54 of the male portion 44; e.g. the same thickness (height), same angle α (discussed below), and the same angle β (discussed below). The body 22 of the leveling portion 12a may have a top edge 24 and two side edges 26. As shown, the side edges 26 may be V-shaped or tapered, wherein the width of the top edge 24 of the body 22 is greater than the width of the bottom edge 27 of the body 22. The side edges 26 of the body 22 may be positioned at a certain angle α relative to one another. In one embodiment, the side edges 26 of the body 22 may be positioned at an angle α of approximately 37.5° relative to one another. In should be clearly understood that substantial benefit may also be derived from the side edges 26 forming an angle α between approximately 35.5° and approximately 39.5° relative to one another. The angle α formed between the side edges 26 of the body 22 relative to one another may vary according to a similar angle α formed between the side surfaces 40 of the female portion 28 (discussed below). Generally, the angle α formed by the side surfaces 40 of the mortise 38 of the female portion 28 relative to one another may be equal to the angle α formed by the side edges 26 of the body 22 relative to one another to help ensure a proper fit between the leveling portion 12a and the female portion 28. It should be noted that if the angle α formed by the side edges 26 of the body 22 relative to one another is too great of an angle, then the leveling portion 12a and female portion 28 may stick together and may not easily disengage. It should also be noted that if the angle α formed by the side edges 26 of the body 22 relative to one another is too small, then a secure fit may not be created between the leveling portion 12a and the female portion 28, which may result in movement of the leveling portion 12a that may lead to inaccurate readings on the bubble vial 14.

Referring to FIGS. 1-3, in one embodiment, a bubble vial receptacle 20 may be coupled to or integral with a top edge 24 of the body 22 and a bubble vial 14 may be housed within the bubble vial receptacle 20. However, it should be clearly understood that substantial benefit may still be derived without the use of a bubble vial receptacle 20. As shown in this embodiment, the bubble vial receptacle 20 may comprise a U-shaped channel adapted to receive the bubble vial 14 therein. The bubble vial receptacle 20 may be coupled perpendicularly to the top edge 24 of the body 22. The bubble vial receptacle 20 may also be positioned horizontally so that the user can level the display item 100 with respect to the ground. The bubble vial 14 may have an air bubble 16 and two reference markings 18. When the air bubble 16 is centered between the two reference markings 18, then it is determined that the bubble vial 14 is level with the ground.

Referring to FIGS. 6-14, the male portion 44 may have a body 46 that defines at least one opening 52 therethrough. The opening 52 may be positioned at a center of the body 46 of the male portion 44 (see FIGS. 10-14) or the opening 52 may be positioned closer to the perimeter of the body 46. It should also be understood that the body 46 may have one opening 46 (see FIGS. 10-14), two openings 46, or any other suitable number of openings 46 therethrough. Although the male portion 44 is shown in the figures as being circular (see FIG. 6) or semicircular (see FIG. 10) in shape, it should be clearly understood that the male portion 44 may have any suitable shape. The opening 52 may be adapted to receive a nail or screw therethrough, or any other coupling mechanism that can secure the male portion 44 to the display item 100 or other item that is to be hanged/displayed. The opening 52 may also be threaded or unthreaded.

Figure 6:
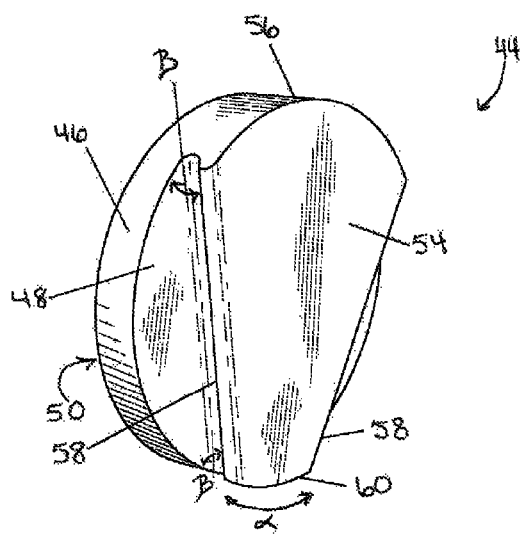
FIG. 6 is a perspective view of a male portion of a hanging device in accordance with one or more aspects of the present invention.
Figure 12:
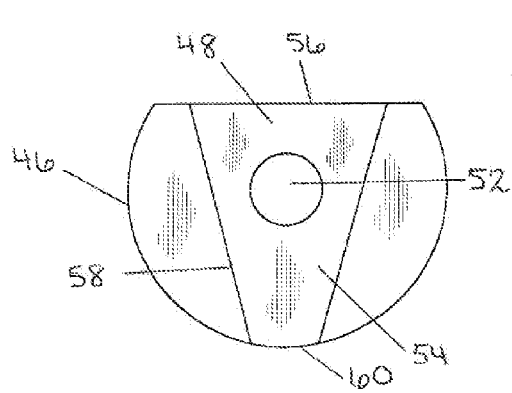
FIG. 12 is a front view of the male portion of FIG. 10.
Figure 13:
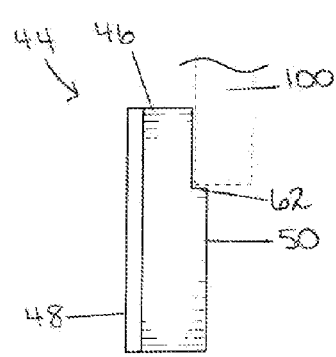
FIG. 13 is a side view of the male portion of FIG. 10 shown in use with a picture frame.
Figure 14:
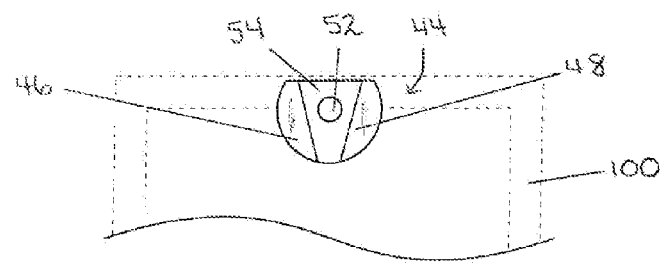
FIG. 14 is a front view of the male portion of FIG. 10 shown in use with a picture frame.
Figure 15:
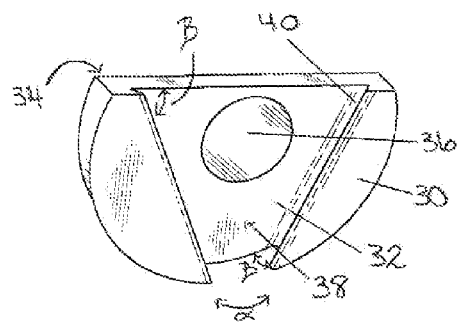
FIG. 15 is a perspective view of a female portion of a hanging device in accordance with one or more aspects of the present invention.
Figure 16:
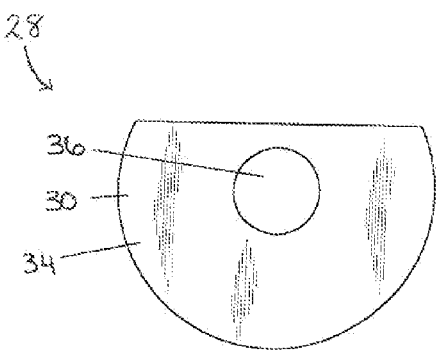
FIG. 16 is a rear view of the female portion of FIG. 15.

Referring to FIGS. 6-14, a dovetail tenon 54 may be formed on a front surface 48 of the body 46 of the male portion 44 of the hanging device 10. The tenon 54 may have a pair of spaced apart side surfaces 58, a top surface 56, and a bottom surface 60. As shown in FIG. 12, where the male portion 44 is semicircular in shape, the side surfaces 58 and the top surface 56 of the tenon 54 may be straight while the bottom surface 60 may be curved. In another embodiment, as shown in FIG. 6 where the male portion 44 is circular in shape, the side surfaces 58 of the tenon 54 may be straight while both the top surface 56 and the bottom surface 60 may both be curved. It should be clearly understood, however, that substantial benefit may be derived from alternative configurations of the side surfaces 58, top surface 56, and bottom surface 60 of the tenon 44; e.g., all of the surfaces 58, 56, and 60 could be straight.

As shown, the tenon 54 may be V-shaped or tapered, wherein the width of the top surface 56 of the tenon 54 is greater than the width of the bottom surface 60 of the tenon 54. The side surfaces 58 may be positioned at a certain angle α relative to one another. For example, the side surfaces 58 of the tenon 54 may be positioned at an angle α of approximately 37.5° relative to one another. In should be clearly understood that substantial benefit may also be derived from the side surfaces 58 forming an angle α between approximately 35.5° and approximately 39.5° relative to one another. The angle α formed between the side surfaces 58 of the tenon 54 relative to one another may vary according to the size of the male portion 44 of the hanging device 10. The angle α formed between the side surfaces 58 of the tenon 54 relative to one another may also vary according to a similar angle α formed between the side surfaces 40 of the female portion 28 (discussed below). Generally, the angle α formed by the side surfaces 40 of the mortise 38 of the female portion 28 relative to one another may be equal to the angle α formed by the side surfaces 58 of the tenon 54 relative to one another to help ensure a proper fit between the male portion 44 and the female portion 28. It should be noted that if the angle α formed by the side surfaces 58 of the tenon 54 relative to one another is too great of an angle, then the male portion 44 and female portion 28 may stick together and may not easily disengage. It should also be noted that if the angle α formed by the side surfaces 58 of the tenon 54 relative to one another is too small, then a secure fit may not be created between the male portion 44 and the female portion 28, which may result in movement of the male portion 44 and the display item 100 being crooked. In some instances where the display item 100 may be jostled by contact or by an earthquake, a loose fit may cause the male portion 44 to disconnect from the female portion 28 and the display item 100 may fall.

As shown in FIGS. 10-12 and 15, the side surfaces 58 of the tenon 54 of the male portion 44 and the side surfaces 40 of the mortise 38 of the female portion 28 may have sharp edges. It should be clearly understood, however, that substantial benefit may still be derived if these edges were more rounded (see FIGS. 5-6) in order to provide more tensile strength between the male portion 44 and female portion 28.

Referring to FIG. 6, the side surfaces 58 of the tenon 54 may form an angle β relative to a front surface 48 of the body 46 of the male portion 44. In the embodiment, the side surfaces 58 of the tenon 54 may form an angle β of approximately 45° with the front surface 48 of the body 46 of the male portion 44 of the hanging device 10. It should be clearly understood, however, that substantial benefit may be derived from the side surfaces 58 of the tenon 54 and the front surface 48 of the body 46 of the male portion 44 forming an angle α between approximately 30° and approximately 60°.

The body 22 of the leveling portion may have angled side edges 26 that have the same angle β as the male portion 44 so that the body 22 of the leveling portion 12 may slidably engage and mate with the dovetail mortise 38 of the female portion 28 (discussed below) in the same fashion that the dovetail tenon 54 of the male portion 44 does.

The tenon 54 may have a thickness (height) that may also vary according to the size of the male portion 44 of the hanging device 10. In one embodiment, the tenon 54 may have a thickness of approximately ¹⁄₁₆ in. In one embodiment the tenon 54 may have the same thickness as the dovetail mortise 38 (described below) on the female portion 28 of the hanging device 10. For example, where the mortise 38 of the female portion 28 may have a thickness of approximately ¹⁄₁₆ in., the tenon 54 of the male portion 44 may also have a thickness of approximately ¹⁄₁₆ in. The tenon 54 on the front surface 48 of the body 46 of the male portion 44 of the hanging device 10 is configured to slidably engage and mate with the mortise 38 on the front surface 32 of the body 30 of the female portion 28 of the hanging device 10.

Figure 7:
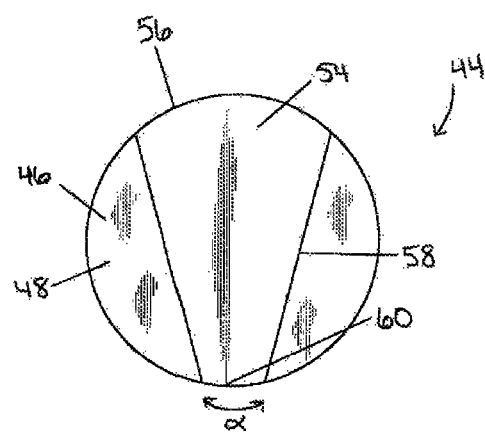
FIG. 7 is a front view of the male portion of FIG. 6.

The male portion 44 of the present invention may have several varieties of mounting structures. Referring to FIGS. 6-7, one embodiment of the male portion 44 is shown. In this embodiment, the rear surface 50 of the body 46 of the male portion 44 may be flat. The rear surface 50 of the male portion 44 may be placed flat against the display item 100 and a screw/nail may be screwed/hammered through the opening 52 of the body 46 of the male portion 44, thereby securing the male portion 44 to the display item 100. It should be clearly understood that adhesives or any other suitable coupling device may be used to couple the rear surface 50 of the body 46 of the male portion 44 to the display item 100.

Figure 8:
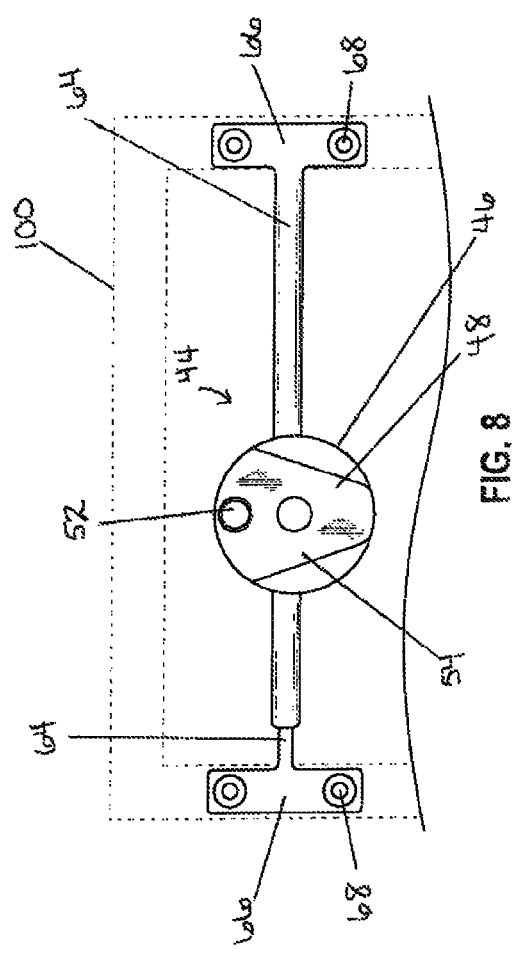
FIG. 8 is a front view of a male portion of a hanging device in accordance with one or more aspects of the present invention shown in use with a picture frame.
Figure 9:
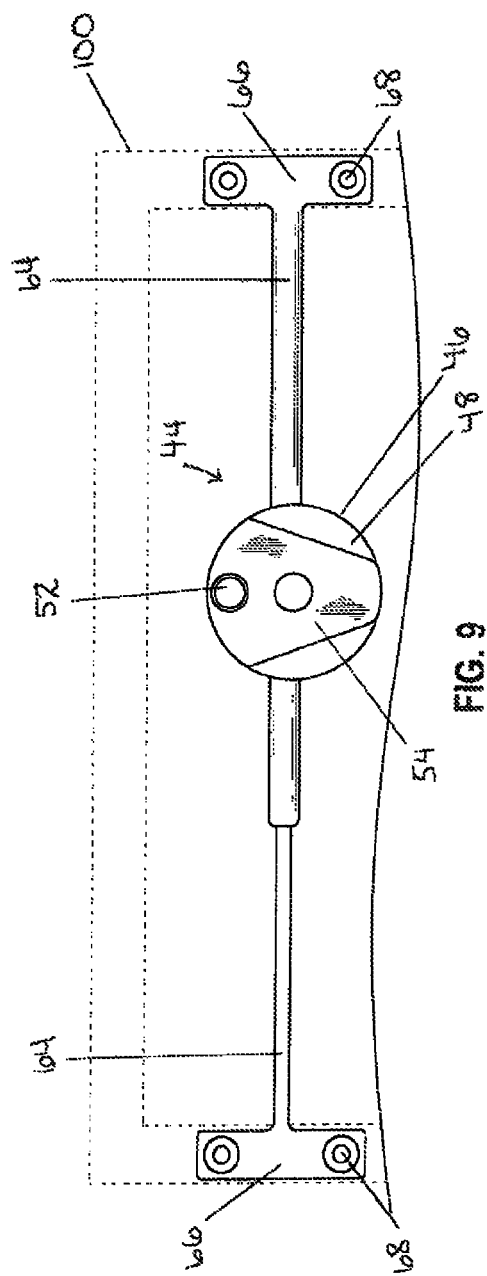
FIG. 9 is a front view of the male portion of FIG. 8 shown in an extended position and shown in use with a picture frame.
Figure 10:
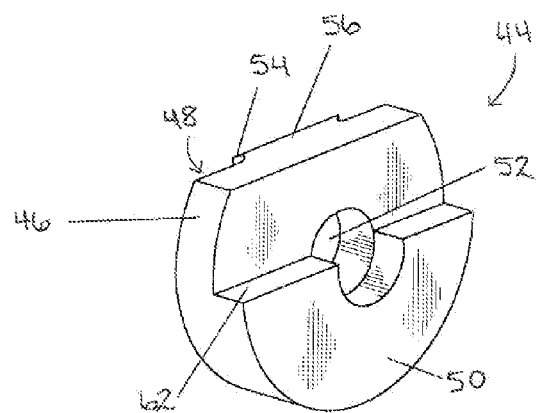
FIG. 10 is a perspective view of a male portion of a hanging device in accordance with one or more aspects of the present invention.
Figure 11:
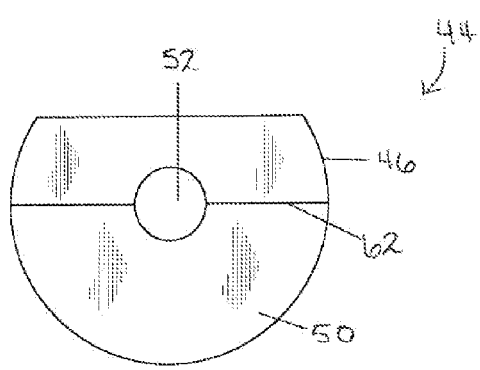
FIG. 11 is a rear view of the male portion of FIG. 10.

Referring to FIGS. 8-9, in this embodiment, the male portion 44 may have arms 64 that can be expanded to accommodate display items 100 of varying widths. In this embodiment, the telescoping arms 64 may expand or retract depending upon the width of the display item 100 (here shown as a picture frame). At the end of each arm 64 is a mounting surface 66 adapted to be coupled to the display item 100. The mounting surface 66 may be flat or the mounting surface 66 may be curved or L-shaped; the mounting surface 66 may be shaped to correspond to the shape of the mounting surface of the display item 100. In this example, the display item 100 is a picture frame that has squared edges. Where the mounting surface 66 is L-shaped, as shown here, each mounting surface 66 may be held flush against opposing squared edges of the display item 100 and coupled thereto with nails/screws inserted into openings 68 within the mounting surfaces 66. Alternatively, the mounting surfaces 66 may be coupled to the display item 100 by adhesives or some other suitable means.

FIGS. 10-14 show another embodiment of the male portion 44. In this embodiment, the rear surface 50 of the body 46 may define a flange 62. The flange 62 may be squared or rounded; the flange 62 may be shaped to correspond to the shape of the mounting surface of the display item 100. In this example, the display item 100 has squared edges. Where the flange 62 is squared, as shown here, the flange may be held flush against opposing squared edges of the display item 100 and coupled thereto with nails/screws inserted into openings 52 within the body 46 of the male portion 44. Alternatively, the mounting surfaces 66 may be coupled to the display item 100 by adhesives or some other suitable means.

Referring to FIGS. 4-5 and 15-20, the female portion 28 may have a body 30 that defines at least one opening 36 therethrough. The opening 36 may be positioned at a center of the body 30 of the female portion 28 (see FIG. 15-16) or the opening 36 may be positioned closer to the perimeter of the body 30 (see FIG. 4-5). It should also be understood that the body 30 may have one opening 36 (see FIG. 15-16), two openings 36 (see FIG. 4-5), or any other suitable number of openings 36 therethrough. Although the female portion 28 is shown in the figures as being circular (see FIG. 4-5) or semicircular (see FIG. 15-16) in shape, it should be clearly understood that the female portion 28 may have any suitable shape. The opening 36 may be adapted to receive a nail or screw therethrough, or any other coupling mechanism that can secure the female portion 28 to a wall, a base, or any other surface from which the picture frame or other item is to be hanged/displayed. The opening 36 may also be threaded or unthreaded.

Figure 5:
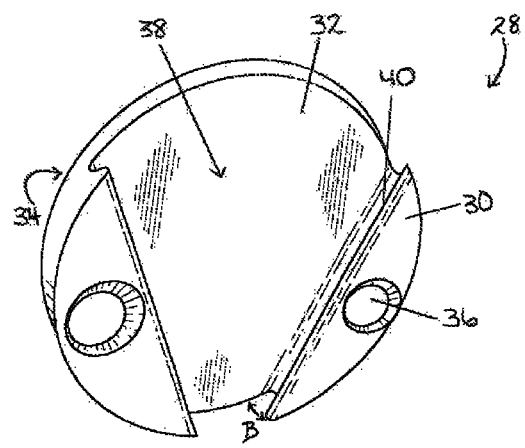
FIG. 5 is a perspective view of the female portion of FIG. 2.

Referring to FIG. 5, a dovetail mortise 38 may be formed within a front surface 32 of the body 30 of the female portion 28 of the hanging device 10. The dovetail mortise 38 is configured to mate with the dovetail tenon 54 of the male portion 44 of the hanging device 10. The mortise 38 may be formed by a pair of spaced apart side surfaces 40 extending downwardly from the front surface 32 and recessed into the body 30 of the female portion 28 of the hanging device 10. In one embodiment, the mortise 38 may be V-shaped or tapered, wherein the width of a top portion of the mortise 38 is greater than the width of a bottom portion of the mortise 38. The side surfaces 40 of the mortise 38 may be positioned at a certain angle α relative to one another, the angle α being dependent upon the size of the female portion 28 of the hanging device 10. For example, for a hanging device 10 that has a diameter of approximately 1.25 in., the side surfaces 40 may be positioned at an angle α of approximately 37.5° relative to one another. This angle α formed by the two side surfaces 40 of the mortise 38 relative to one another may range between approximately 35.5° and approximately 39.5° for a 1.25 in. diameter female portion 28. The angle α formed between the side surfaces 40 of the mortise 38 relative to one another may vary according to the diameter of the female portion 28. It should be noted that if the angle α formed by the side surfaces 40 relative to one another is too great of an angle, then the male portion 44 (or the leveling portion 12) may stick to the female portion 28 of the hanging device 10 and may not easily disengage. It should also be noted that if the angle α formed by the side surfaces 40 relative to one another is too small, then a secure fit may not be created between the male portion 44 and the female portion 28 of the hanging device 10, which may result in movement of the male portion 44 and the picture frame being crooked. As previously mentioned, if the picture frame is jostled, a loose fit may cause the male portion 44 to disconnect from the female portion 28 and the picture frame may fall. Generally, the angle α formed by the side surfaces 58 of the tenon 54 relative to one another may be equal to the angle α formed by the side surfaces 40 of the mortise 38 relative to one another to help ensure a proper fit between the male portion 44 and the female portion 28.

As shown in FIG. 5, the side surfaces 40 of the mortise 38 may form an angle β relative to the front surface 32 of the body 30 of the female portion 28. In one embodiment, the side surfaces 40 may form an angle β of approximately 45° with the front surface 32 of the body 30 of the female portion 28 of the hanging device 10. It should be clearly understood, however, that substantial benefit may be derived from the side surfaces 40 of the mortise 38 and the front surface 32 of the body 30 of the female portion 28 forming an angle β between approximately 30° and approximately 60°. Generally, the angle β formed by the side surfaces 40 of the mortise 38 with the front surface 32 of the body 30 of the female portion 28 may be equal to the angle β formed by the side surfaces 58 of the tenon 54 with the front surface 48 of the body 46 of the male portion 44. This will help to ensure a secure fit between the male portion 44 and the female portion 28.

The mortise 38 may have a thickness (depth) that may vary according to the size of the female portion 28 of the hanging device 10. In one embodiment, the dovetail tenon 54 may have the same thickness as the dovetail mortise 38. For example, where the tenon 54 of the male portion 44 may have a thickness of approximately 1/16 in, the mortise 38 of the female portion 28 may also have a thickness of approximately 1/16 in. The mortise 38 on the front surface 32 of the body 30 of the female portion 28 of the hanging device 10 is configured to slidably engage and mate with the tenon 54 on the front surface 48 of the body 46 of the male portion 44 of the hanging device 10.

The female portion 28 of the present invention may have several varieties of mounting structures. One embodiment of the female portion 28 is shown in FIGS. 4-5 and 15-16. In this embodiment, the rear surface 34 of the body 30 of the female portion 28 may be flat. The rear surface 34 of the body 30 of the female portion 28 may be placed flat against the wall or other desired flat surface and a screw/nail may be screwed/hammered through the opening 36 of the body 30 of the female portion 28, thereby securing the female portion 28 to the wall or other flat surface. It should be clearly understood that adhesives or any other suitable coupling device may be used to couple the rear surface 34 of the body 30 of the female portion 28 to the wall or other flat surface.

Figure 17:
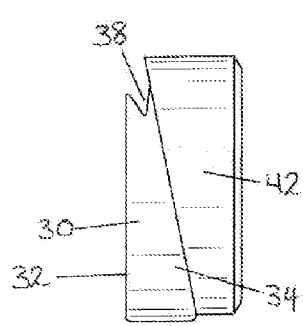
FIG. 17 is a side view of a female portion of a hanging device in accordance with one or more aspects of the present invention.
Figure 18:
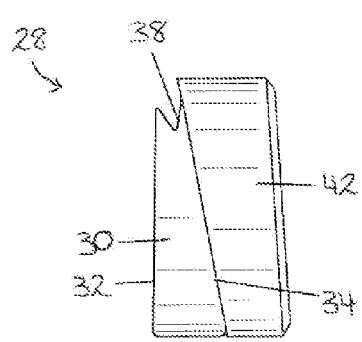
FIG. 18 is a side view of the female portion of the hanging device of FIG. 17 shown with the base slightly rotated in relation to the body.

In another embodiment shown in FIG. 17-20, the female portion 28 may have a base 42 coupled to the rear surface 34 of the body 30 of the female portion 28. Referring to FIGS. 17-18, the base 42 may be coupled to the wall or other desired surface and the rear surface 34 of the body 30 of the female portion 28 may be rotatably coupled to the base 42. Therefore, when the male portion 44 on a display item 100 is coupled to the female portion 28, the display item 100 may be rotated in relation to the female portion 28 that is fixedly coupled to the wall or other desired surface. The display item 100 may be rotated any desired amount less than approximately 90° in relation to the female portion 28, so that the male portion 44 does not disengage the female portion 28 thereby causing the display item 100 to fall.

Figure 19:
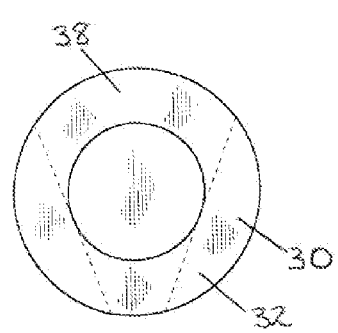
FIG. 19 is a front view of a female portion of the hanging device in accordance with one or more aspects of the present invention.
Figure 20:
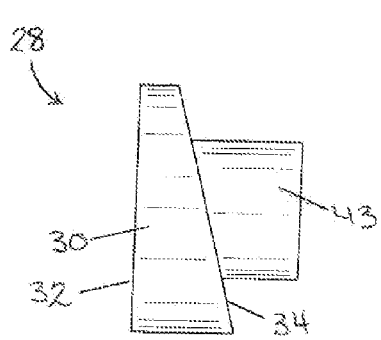
FIG. 20 is a side view of the female portion of the hanging device of FIG. 19.

In another embodiment shown in FIGS. 19-20, the base 43 may be coupled to the wall or other desired surface and the rear surface 34 of the body 30 of the female portion 28 may be coupled to the base 42 with a ball and socket joint or with any other joint that allows multiaxial movement. Therefore, when the male portion 44 on a display item 100 is coupled to the female portion 28, the display item 100 may be moved along any axis in relation to the female portion 28 that is fixedly coupled to the wall or other desired surface. The display item 100 may be tilted up, down, left, right, or diagonal in relation to the female portion 28.

The male portion 44 and the female portion 28 of the hanging device 10 may each have a gage point. The gage point is a reference point used to position the male portion 44 in relation to the female portion 28 so that secure connection is created between them. Specifically, for the female portion 28, the gage point is measured from the center point of the body 30 of the female portion 28 to a point on the side surface 40 of the mortise 38. On the female portion 28, the height of the gage point is typically located at a point that is half the thickness (depth) of the mortise 38 and its distance from the center point of the body 30 of the female portion 28 depends upon the diameter of the body 30 of the female portion 28 and the angle β formed by the side surface 40 with the body 30 of the female portion 28. Once the gage point of the female portion 28 is determined, the gage point of the male portion 44 may be made equal to the gage point of the female portion 28. The gage point generally varies according to the size of the items being hung or displayed, the shape of the hanging device 10, and the desired strength of the connection between the male portion 44 and the female portion 28.

Figure 21:
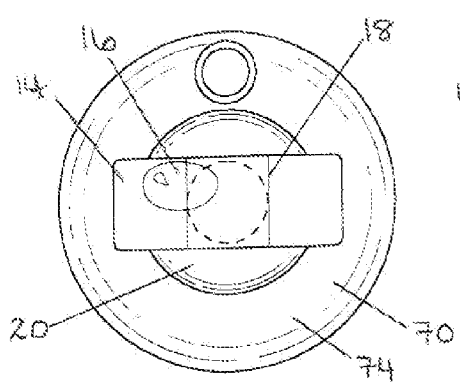
FIG. 21 is a rear view of a leveling portion in accordance with one or more aspects of the present invention.
Figure 22:
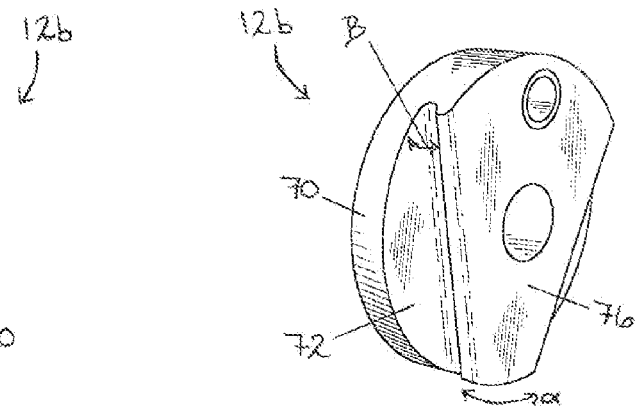
FIG. 22 is a perspective view of the leveling portion of FIG. 21.
Figure 23:
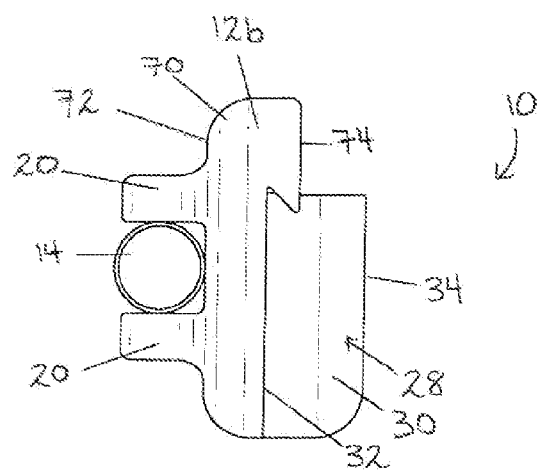
FIG. 23 is a side view of the leveling portion of FIG. 21 shown coupled to a female portion.

Referring to FIGS. 21-23, another embodiment of a leveling portion 12b (referred to generically as leveling portion 12) is shown. The leveling portion 12b may be structurally similar to the male portion 44 of the hanging device 10. The leveling portion 12b may have a body 70 with a front surface 72 and dovetail tenon 76 that are identical in size and dimension to the body 46 with the front surface 48 and dovetail tenon 54 of the male portion 44. However, the leveling portion 12b may also have a bubble vial 14 is coupled to the rear surface 74 of the body 70 of the leveling portion 12b. As shown, the bubble vial 14 may be held within a bubble vial receptacle 20 that is integral with the rear surface 74 of the body 70. The bubble vial 14 may be positioned horizontally so that the user can level the display item 100 with respect to the ground.

In order to hang a display item using the hanging device 10 of the present invention, the user may couple the leveling portion 12 to the female portion 28 by slidably engaging the body 22 or the dovetail tenon 76 of the leveling portion 12 with the dovetail mortise 38 of the female portion 28. Using the bubble vial 14 of the leveling portion 12 as a reference, the user may couple the rear surface 34 of the body 30 of the female portion 28 to the fixed surface (e.g. a wall) in a position that is determined by the bubble vial 14 to be level with the ground. The leveling portion 12 may then be removed from the female portion 28 that is now coupled to the fixed surface. The rear surface 50 of the body 46 of the male portion 44 of the hanging device 10 may be coupled to the display item 100. The user may couple the male portion 44 to the female portion 28 by slidably engaging the dovetail tenon 54 of the mail portion 44 with the dovetail mortise 38 of the female portion 28.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public.

What is claimed is:

1. A hanging device comprising:
    a male portion comprising:
        a body; and
        a dovetail tenon integral with a front surface of the body of the male portion;
    a female portion comprising:
        a body; and
        a dovetail mortise recessed within a front surface of the body of the female portion and adapted to mate with the dovetail tenon; and
    a leveling portion comprising:
        a body adapted to mate with the dovetail mortise, wherein the body of the leveling portion is shaped like the dovetail tenon of the male portion and is adapted to slidably engage the dovetail mortise; and
        a bubble vial coupled to the body of the leveling portion, wherein the leveling portion is used temporarily to determine the position of the female portion, after the leveling portion is removed, the male portion is attached to the female portion to support a display item.

2. The hanging device of claim 1 wherein the dovetail tenon comprises:
    a top surface;
    a bottom surface; and
    a pair of spaced apart side surfaces;
    wherein the tenon is V-shaped.

3. The hanging device of claim 2 wherein the pair of side surfaces are positioned at an angle of between approximately 35.5° and approximately 39.7° relative to one another.

4. The hanging device of claim 2 wherein each of the side surfaces forms an angle of between approximately 30° and 60° with a front surface of the body of the male portion.

5. The hanging device of claim 1 wherein the dovetail mortise comprises:
    a pair of spaced apart side surfaces;
    wherein the mortise is V-shaped.

6. The hanging device of claim 5 wherein the pair of side surfaces are positioned at an angle of between approximately 35.5° and approximately 39.7° relative to one another.

7. The hanging device of claim 5 wherein each of the side surfaces forms an angle of between approximately 30° and 60° with the front surface of the body of the female portion.

8. The hanging device of claim 1 wherein the leveling portion further comprises a bubble vial receptacle coupled to the body of the leveling portion for housing the bubble vial in a horizontal orientation.

9. A system for hanging items:
    a male portion comprising:
        a body; and
        a V-shaped dovetail tenon integral with a front surface of the body of the male portion;
    a female portion comprising:
        a body; and
        a V-shaped dovetail mortise recessed within a front surface of the body of the female portion and adapted to mate with the dovetail tenon; and
    a leveling portion comprising:
        a body adapted to mate with the dovetail mortise, wherein the body of the leveling portion is shaped like the dovetail tenon of the male portion and is adapted to slidably engage the dovetail mortise;
        a bubble vial coupled to the body of the leveling portion; and
        a bubble vial receptacle coupled to the body of the leveling portion for housing the bubble vial in a horizontal orientation, wherein the leveling portion is used temporarily to determine the position of the female portion, after the leveling portion is removed, the male portion is attached to the female portion to support a display item.

10. The hanging device of claim 9 wherein the dovetail mortise comprises:
    a pair of spaced apart straight side surfaces;
    wherein each of the straight side surfaces forms an angle of approximately 45° with the front surface of the body of the female portion.

11. The hanging device of claim 9 wherein the dovetail tenon comprises:
    a top surface;
    a bottom surface; and
    a pair of spaced apart side surfaces, wherein each of the side surfaces forms an angle of approximately 45° with the front surface of the body of the male portion.

12. A system for hanging items:
    a male portion comprising:
        a body; and
        a V-shaped dovetail tenon integral with a front surface of the body of the male portion, wherein the dovetail tenon comprises:
            a top surface;
            a bottom surface; and a pair of spaced apart side surfaces, wherein the pair of side surfaces of the dovetail tenon are positioned at an angle of between approximately 35.5° and approximately 39.7° relative to one another;

a female portion comprising:
  a body; and
  a V-shaped dovetail mortise recessed within a front surface of the body of the female portion and adapted to mate with the dovetail tenon, wherein the dovetail mortise comprises:
    a pair of spaced apart side surfaces, wherein the pair of side surfaces of the dovetail mortise are positioned at an angle of between approximately 35.5° and approximately 39.7° relative to one another; and a leveling portion comprising:
  a body adapted to mate with the dovetail mortise, wherein the body of the leveling portion is shaped like the dovetail tenon of the male portion and is adapted to slidably engage the dovetail mortise;
  a bubble vial coupled to the body of the leveling portion; and
  a bubble vial receptacle coupled to the body of the leveling portion for housing the bubble vial in a horizontal orientation, wherein the leveling portion is used temporarily to determine the position of the female portion, after the leveling portion is removed, the male portion is attached to the female portion to support a display item.

13. The hanging device of claim 12 wherein each of the side surfaces of the dovetail tenon of the male portion forms an angle of between approximately 30° and 60° with the front surface of the body of the male portion.

14. The hanging device of claim 12 wherein each of the side surfaces of the dovetail mortise of the female portion forms an angle of between approximately 30° and 60° with the front surface of the body of the female portion.

\* \* \* \* \*